United States Patent
Lee et al.

(10) Patent No.: US 10,622,670 B2
(45) Date of Patent: Apr. 14, 2020

(54) POSITIVE ELECTRODE ACTIVE MATERIAL FOR SECONDARY BATTERY AND METHOD FOR PREPARING THE SAME

(71) Applicant: LG Chem, Ltd., Seoul (KR)

(72) Inventors: Dae Jin Lee, Daejeon (KR); Dong Hun Lee, Daejeon (KR); Ji Hoon Ryu, Daejeon (KR); Gi Beom Han, Daejeon (KR); Dong Hwi Kim, Daejeon (KR); Wang Mo Jung, Daejeon (KR); Sang Wook Lee, Daejeon (KR)

(73) Assignee: LG Chem, Ltd. (KR)

( * ) Notice: Subject to any disclaimer, the term of this patent is extended or adjusted under 35 U.S.C. 154(b) by 212 days.

(21) Appl. No.: 15/896,357

(22) Filed: Feb. 14, 2018

(65) Prior Publication Data
US 2018/0233766 A1    Aug. 16, 2018

(30) Foreign Application Priority Data
Feb. 14, 2017 (KR) .......................... 10-2017-0019885

(51) Int. Cl.
*H01M 10/052* (2010.01)
*H01M 4/131* (2010.01)
*H01M 4/1391* (2010.01)
*H01M 4/36* (2006.01)
*H01M 10/42* (2006.01)
*H01M 4/02* (2006.01)
*H01M 4/62* (2006.01)

(52) U.S. Cl.
CPC ......... *H01M 10/052* (2013.01); *H01M 4/131* (2013.01); *H01M 4/1391* (2013.01); *H01M 4/62* (2013.01); *H01M 10/4235* (2013.01); *H01M 4/366* (2013.01); *H01M 2004/028* (2013.01)

(58) Field of Classification Search
CPC ............... H01M 10/052; H01M 4/131; H01M 2004/028; H01M 4/1391; H01M 4/62; H01M 4/366; H01M 4/48; H01M 4/485; H01M 4/505; H01M 4/525; H01M 4/58; C01G 53/50; C01P 2002/02; C01P 2004/84
See application file for complete search history.

(56) References Cited

U.S. PATENT DOCUMENTS

2004/0200998 A1    10/2004   Park et al.
2011/0165463 A1*   7/2011    Chang ................... H01M 4/366
                                                           429/223

(Continued)

FOREIGN PATENT DOCUMENTS

KR    10-2003-0083476       10/2003
WO    WO-2011043419 A1 *    4/2011    .......... H01M 10/052

*Primary Examiner* — Basia A Ridley
*Assistant Examiner* — Heng M. Chan
(74) *Attorney, Agent, or Firm* — Lerner, David, Littenberg, Krumholz & Mentlik, LLP

(57) ABSTRACT

The present invention relates to a positive electrode active material for a secondary battery, which comprises a core including a lithium composite metal oxide, and a surface treatment layer located on a surface of the core and including an amorphous oxide, wherein the amorphous oxide including silicon (Si), nitrogen (N) and at least one metal element selected from the group consisting of a Group 1A element, a Group 2A element, and a Group 3B element, and a method for preparing the same.

14 Claims, 1 Drawing Sheet

(56) References Cited

U.S. PATENT DOCUMENTS

| | | | |
|---|---|---|---|
| 2013/0209890 A1* | 8/2013 | Nagatomi | C01G 33/00 429/231.5 |
| 2015/0111106 A1* | 4/2015 | Son | H01M 4/0471 429/223 |
| 2015/0228969 A1* | 8/2015 | Cho | H01M 4/366 429/223 |
| 2016/0181611 A1* | 6/2016 | Cho | H01M 4/525 429/221 |
| 2017/0155132 A1* | 6/2017 | Kong | H01M 4/366 |

* cited by examiner

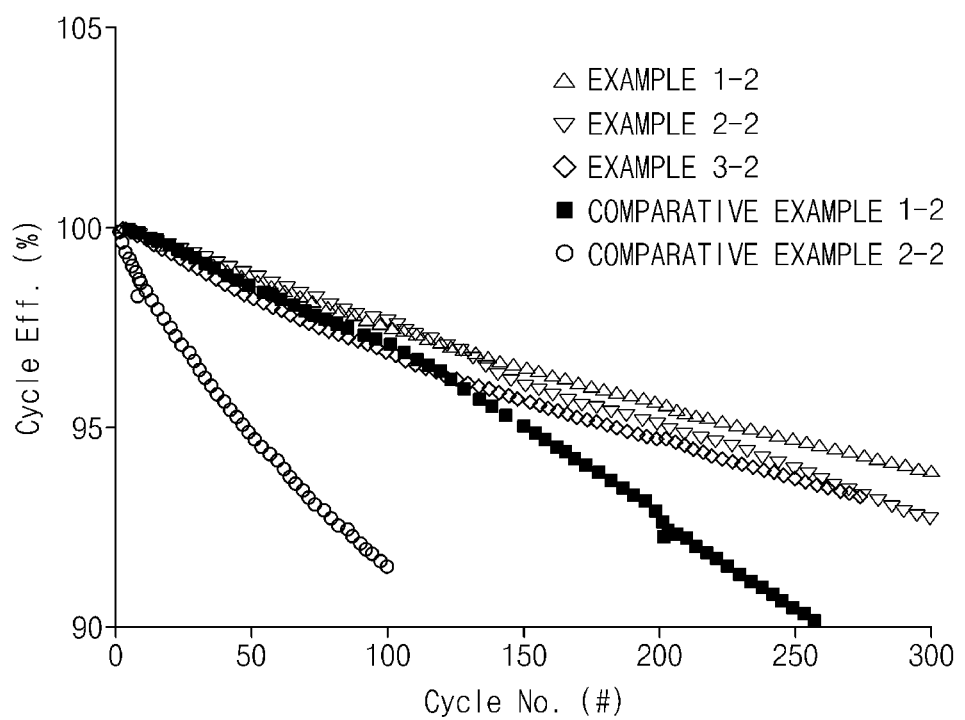

POSITIVE ELECTRODE ACTIVE MATERIAL FOR SECONDARY BATTERY AND METHOD FOR PREPARING THE SAME

CROSS-REFERENCE TO RELATED APPLICATION

This application claims priority to and the benefit of Korean Patent Application No. 10-2017-0019885, filed on Feb. 14, 2017, the disclosure of which is incorporated herein by reference in its entirety.

TECHNICAL FIELD

The present invention relates to a positive active material for a secondary battery, which enables the secondary battery to have excellent lifespan characteristics and high-voltage stability, and a method for preparing the same.

RELATED ART

The demand for secondary batteries as an energy source is dramatically increasing due to technical development and increased demand for mobile devices. Among these secondary batteries, lithium secondary batteries having higher energy density and voltage, a longer cycle life, and a lower self-discharge rate have been commercialized and widely used.

However, lithium secondary batteries have a problem that their lifespans are rapidly deteriorated as charging and discharging are repeated. In particular, the problem is more serious in long-life or high-voltage batteries. The problem is caused by phenomena in which electrolytes of the batteries are decomposed or active materials thereof are deteriorated due to moisture inside the batteries or other influences, and the internal resistance of the batteries is increased. Particularly, if elution of elements constituting a positive electrode active material of the batteries is increased, lifespans of the batteries can be rapidly degraded. If degradation of the positive electrode material itself is intensified, the batteries cannot be used at high voltage.

Methods of forming a surface treatment layer on a surface of a positive electrode active material have been proposed to solve such problems. Among them, in case of an aluminum-based surface treatment layer, which is recognized as having stability in an electrolyte and at high voltage, it is difficult to be uniformly applied on an entire active material since it is applied on surfaces of particles in a crystalline state. In addition, there is a problem that resistance due to the crystallinity of an aluminum-based compound itself increases. In addition, a boron (B)-based coating does not interfere with the movement of lithium ions moving from a positive electrode material to an electrolyte by being uniformly coated in an amorphous state. However, the boron (B)-based coating does not function as a coating layer when a reaction with an electrolyte is prolonged because the boron (B)-based coating reacts with moisture.

Accordingly, there is an urgent need to develop a positive electrode active material capable of improving the performance of a lithium secondary battery without such above-described problems.

The above information disclosed in this section is merely for enhancement of understanding of the background of the disclosure and therefore it may contain information that does not form the prior art that is already known in this country to a person of ordinary skill in the art.

SUMMARY

The present invention is directed to provide a positive active material for a secondary battery, which enables the battery to have excellent lifespan characteristics and high-voltage stability, and a method for preparing the same by providing a positive electrode active material including a surface treatment layer having high hardness, excellent elasticity, excellent chemical resistance, and excellent fracture toughness.

An aspect of the present invention provides a positive electrode active material for a secondary battery, including: a core including a lithium composite metal oxide; and a surface treatment layer located on a surface of the core and including an amorphous oxide. The amorphous oxide includes silicon (Si), nitrogen (N), and at least one metal element selected from the group consisting of a Group 1A element, a Group 2A element, and a Group 3B element.

Another aspect of the present invention provides a method for preparing a positive electrode active material for a secondary battery, including: a first process of forming an amorphous oxide using a first raw material including silicon, a second raw material including nitrogen, and a third raw material including at least one metal element selected from the group consisting of a Group 1A element, a Group 2A element, and a Group 3B element; and a second process of forming a surface treatment layer including the amorphous oxide on a lithium composite metal oxide by mixing the amorphous oxide and the lithium composite metal oxide and performing a heat treatment.

The present invention provides a positive electrode for use in a secondary battery, a secondary battery, a battery module, and a battery pack including the positive electrode active material.

A positive electrode active material for a secondary battery according to the present invention includes a surface treatment layer including an amorphous oxide including silicon (Si), nitrogen (N), and at least one metal element selected from the group consisting of a Group 1A element, a Group 2A element, and a Group 3B element, so that the hardness of a positive electrode active material is increased and elasticity, chemical resistance and fracture toughness are improved, and thus the structural stability of the positive electrode active material can be improved. Accordingly, the lifespan characteristics and high-voltage stability of a secondary battery as a final product can be improved.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a graph showing discharge capacity retention rates according to the number of cycles of a lithium secondary battery of Examples 1-2 to 3-2, Comparative Example 1-2, and Comparative Example 2-2.

DETAILED DESCRIPTION

Hereinafter, exemplary embodiments of the present disclosure will be described below in more detail with reference to the accompanying drawings. The present disclosure may, however, be embodied in different forms and should not be construed as limited to the exemplary embodiments set forth herein. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the disclosure.

A positive electrode active material for a secondary battery according to an embodiment of the present invention may include a core and a surface treatment layer.

The surface treatment layer may include an amorphous oxide located on a surface of the core and including silicon (Si), nitrogen (N), and at least one metal element selected from the group consisting of a Group 1A element, a Group 2A element, and a Group 3B element.

The amorphous oxide may flexibly cope with a volume change of the core due to intercalation and deintercalation of lithium because the amorphous oxide has a very high hardness and excellent elasticity. Accordingly, the amorphous oxide may stably protect the core. The amorphous oxide is not damaged even after long contact with an electrolyte and electrolyte-derived hydrogen fluoride because the amorphous oxide has excellent chemical resistance. Accordingly, direct contact between the core and the electrolyte or electrolyte-derived hydrogen fluoride may be prevented by the amorphous oxide during operation of a secondary battery. Further, the amorphous oxide has excellent fracture toughness, and as a result, the rolling density of the positive electrode active material may be increased.

Lifespan characteristics, output characteristics, and cycle characteristics of a secondary battery as a final product may be improved, and the amount of gas generated in the battery may be reduced, due to an effect of the amorphous oxide.

The amorphous oxide may include silicon oxide ($SiO_2$); a nitride including at least one metal or semi-metal element selected from the group consisting of a Group 3A element and a Group 4A element; and a metal oxide including at least one metal element selected from the group consisting of a Group 1A element, a Group 2A element, and a Group 3B element.

The silicon oxide is a component forming a glass network of the amorphous oxide. The lithium ion conductivity of the positive electrode active material may be prevented from being significantly degraded due to the amorphous oxide because the silicon oxide has high lithium ion conductivity. Further, the silicon oxide may impart suitable adhesion to allow the amorphous oxide to be smoothly adhered to the core. The silicon oxide may impart elasticity to the amorphous oxide to allow the amorphous oxide to flexibly respond to a volume change of the core that occurs during oxidation and reduction processes.

Capacity of a secondary battery as a final product may be improved by increasing the rolling density of the positive electrode active material because the nitride has high hardness and excellent durability, that is, fracture toughness. Further, since the nitride has excellent chemical resistance, the amorphous oxide including the nitride may not be damaged even after long contact with an electrolyte and electrolyte-derived hydrogen fluoride, thereby effectively protecting the core from the electrolyte and the electrolyte-derived hydrogen fluoride.

The nitride may include at least one metal or semi-metal element selected from the group consisting of a Group 3A element and a Group 4A element. In some embodiments, it may be at least one selected from the group consisting of silicon nitride ($Si_3N_4$) and aluminum nitride (AlN).

The metal oxide may further improve the hardness and fracture toughness of the amorphous oxide.

The metal oxide may include at least one metal element selected from the group consisting of a Group 1A element, a Group 2A element, and a Group 3B element. In some embodiments, it may be at least one selected from the group consisting of sodium oxide ($Na_2O$), magnesium oxide (MgO), calcium oxide (CaO), and yttrium oxide ($Y_2O_3$). For example, it may be magnesium oxide (MgO) or yttrium oxide ($Y_2O_3$).

A molar ratio of the silicon oxide, the nitride, and the metal oxide in the amorphous oxide may be (0.5 to 1.5):(0.5 to 1.5):(0.5 to 1.5). In some embodiments, it may be (0.8 to 1.2):(0.8 to 1.2):(0.8 to 1.2). When the above-described range is satisfied, the hardness and fracture toughness of the amorphous oxide may be further improved. Further, meltability and moldability may be improved by lowering high-temperature viscosity. When the molar ratio is less than the above-described range, precipitation may occur during the preparation of the amorphous oxide, so that characteristics of the surface treatment layer may be rather lowered. On the other hand, when the molar ratio exceeds the above-described range, a thermal expansion coefficient of the amorphous oxide may become excessively high to lower thermal stability, and a metal in the metal oxide may be eluted due to solubility thereof.

The amorphous oxide may have a softening temperature (Ts) of 300° C. to 700° C. When the above-described range is satisfied, the amorphous oxide may be easily formed on the core without damaging a lithium composite metal oxide included in the positive electrode active material.

In addition, the surface treatment layer including the above-described amorphous oxide may be formed on an entire surface of the core, or partially formed on a surface of the core. In some embodiments, the surface treatment layer may be formed on a surface area of 25% or more and less than 100% of the total surface area of the core when the surface treatment layer is partially formed. When the area of the surface treatment layer is formed to be less than 25%, an improving effect caused by the formation of the surface treatment layer may be insignificant. More specifically, the surface treatment layer may be formed on a surface area of 25% to 99% of the total surface area of the core.

On the other hand, a plurality of surface treatment layers formed locally on the surface of the core may be present when the surface treatment layer is partially formed.

In addition, the surface treatment layer is preferably formed to have a suitable thickness in consideration of a particle diameter of the core which determines the capacity of the positive electrode active material. Specifically, the surface treatment layer may be formed to have an average thickness ratio of 0.01 to 0.1 times the core radius. When the thickness ratio of the surface treatment layer is less than 0.01 times the core radius, an improving effect caused by the formation of the surface treatment layer may be insignificant. On the other hand, when the thickness ratio of the surface treatment layer is more than 0.1 times the core radius, resistance to lithium ions passing through the surface treatment layer may be increased.

The particle diameter of the core and the thickness of the surface treatment layer may be measured, for example, by particle section analysis using a forced ion beam (FIB).

Meanwhile, the core included in the positive electrode active material for a secondary battery according to embodiments of the present invention may include a lithium composite metal oxide.

The lithium composite metal oxide is a compound enabling reversible intercalation and deintercalation of lithium (lithiated intercalation compound). The lithium composite metal compound may be a layered lithium composite metal oxide which is able to be used at high capacity and high voltage.

The lithium composite metal compound may be represented by Chemical Formula 1 below.

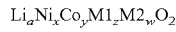

$Li_aNi_xCo_yM1_zM2_wO_2$         <Chemical Formula 1>

In Formula 1,
M1 is at least one selected from the group consisting of Mn and Al, M2 is at least one elements selected from the group consisting of W, Mo, Zr, Ti, Mg, Ta, Fe, V, Cr, Ba, Ca, and Nb, and $0.8 \leq a \leq 1.5$, $0.3 \leq x < 1$, $0 < y \leq 0.5$, $0 < z \leq 0.5$, $0 \leq w \leq 0.02$ and $x+y+z+w=1$.

Li may be included in an amount corresponding to a, that is, $0.8 \leq a \leq 1.5$ in the lithium composite metal oxide represented by Chemical Formula 1. When a is less than 0.8, capacity may be deteriorated, and when a exceeds 1.5, particles may be sintered in a calcination process, which may make the preparation of active materials difficult. More specifically, Li may be included in an amount of $1.0 \leq a \leq 1.15$ in consideration of the remarkable effect of improving capacity characteristics of the positive electrode active material according to Li content control and the balance of sinterability during the preparation of the active material.

In the lithium composite metal oxide represented by Chemical Formula 1, Ni may be included in an amount corresponding to x, that is, $0.3 \leq x < 1$, suitably, $0.35 \leq x \leq 0.9$, and more suitably, $0.6 \leq x < 0.9$. When the above-described range is satisfied, better capacity characteristics and high-temperature stability may be realized.

In the lithium composite metal oxide represented by Chemical Formula 1, Co may be included in an amount corresponding to y, that is, $0 \leq y \leq 0.5$, and preferably, $0.02 \leq y \leq 0.35$. When the above-described range is satisfied, the effect of improving capacitance characteristics according to the inclusion of Co may be remarkable. When y is 0, capacity characteristics may be deteriorated, and when y exceeds 0.5, costs may be increased.

In the lithium composite metal oxide of Chemical Formula 1, M1 may be at least one selected from the group consisting of Mn and Al. When M1 is Mn, a secondary battery as a final product may have high capacity and output characteristics thereof may be improved because the capacity characteristics and structural stability of the positive electrode active material may be improved. When M1 is Al, output characteristics of the active material may be improved.

M1 may be included in an amount corresponding to z, that is, $0 < z \leq 0.5$, and suitably, $0.1 \leq z \leq 0.3$. When the above-described range is satisfied, battery characteristics may be improved. When z is 0, an improvement effect according to the inclusion of M1 may not be obtained, and when z exceeds 0.5, the output characteristics and capacity characteristics of the secondary battery may be rather deteriorated.

Elements of Ni, Co, and M1 in the lithium composite metal oxide of Chemical Formula 1 may be partially substituted or doped with another element (M2) to improve battery characteristics by controlling the distribution of metal elements in the active material. Specifically, M2 may be at least one element selected from the group consisting of W, Mo, Zr, Ti, Mg, Ta, Fe, V, Cr, Ba, Ca, and Nb, and suitably may be Ti or Mg. The structural stability of the positive electrode active material may be improved due to M2, and as a result, output characteristics of the secondary battery may be improved.

The element of M2 may be included in an amount corresponding to w within a range that does not deteriorate characteristics of the positive electrode active material, that is, $0 \leq w \leq 0.02$.

The core may be a primary particle or a secondary particle in which primary particles are aggregated. Here, the primary particles may be uniform or non-uniform.

The core may have an average particle diameter ($D_{50}$) of 1 μm to 20 μm in consideration of a specific surface area of the positive electrode active material and a density of a positive electrode mixture. When the average particle diameter of the positive electrode active material is less than 1 μm, dispersibility in the positive electrode mixture may be deteriorated due to agglomeration between the positive electrode active materials. On the other hand, when the average particle diameter of the positive electrode active material exceeds 20 μm, deterioration in mechanical strength and a decrease in specific surface area may be caused in the positive electrode active material. The core may have an average particle diameter ($D_{50}$) of 3 μm to 18 μm in consideration of the remarkable effect of improving rate characteristics and initial capacity characteristics of the battery according to control of the core particle size. When the core is the secondary particle, the average particle diameter ($D_{50}$) of the primary particles constituting the secondary particle may be 50 nm to 1,000 nm.

The average particle diameter ($D_{50}$) of the positive electrode active material may be defined as a particle diameter at 50% of a particle diameter distribution. The average particle diameter ($D_{50}$) of the positive electrode active material may be measured using, for example, a laser diffraction method. In some embodiments, particles of the positive electrode active material are dispersed in a dispersion solvent, and irradiated with ultrasonic waves having a frequency of about 28 kHz at an output of 60 W using a commercially available laser diffraction particle size measurement device (e.g., Microtrac MT 3000), and the average particle diameter ($D_{50}$) of the positive electrode active material at 50% of a particle diameter distribution may be calculated in the measurement device.

The positive electrode active material according to embodiments of the present invention having the above-described structure and configuration may have an average particle diameter ($D_{50}$) of 1 μm to 20 μm and a BET specific surface area of 0.1 $m^2/g$ to 1.9 $m^2/g$.

When the average particle diameter ($D_{50}$) of the positive electrode active material is less than 1 μm or the BET specific surface area exceeds 1.9 $m^2/g$, the dispersibility of the positive electrode active material in the active material layer may be deteriorated due to aggregation between the positive electrode active materials and resistance in an electrode may be increased. When the average particle diameter ($D_{50}$) of the positive electrode active material exceeds 20 μm or the BET specific surface area is less than 0.1 $m^2/g$, the dispersibility of the positive electrode active material itself may be deteriorated and capacity may be decreased. In addition, the positive electrode active material according to embodiments of the present invention may exhibit excellent capacity and charge/discharge characteristics by simultaneously satisfying the above-described average particle diameter and BET specific surface area conditions. In some embodiments, the positive electrode active material may have an average particle diameter ($D_{50}$) of 3 μm to 18 μm and a BET specific surface area of 0.2 $m^2/g$ to 0.7 $m^2/g$.

The average particle diameter ($D_{50}$) of the positive electrode active material may be defined and measured in the same manner as in the above-described measurement of the average particle diameter of the core. The specific surface area of the positive electrode active material may be measured by, e.g., the Brunauer-Emmett-Teller (BET) method, and specifically, calculated from an adsorption amount of nitrogen gas in a liquid nitrogen atmosphere (77K) using BELSORP-mino II (BEL Japan).

In addition, the positive electrode active material according to embodiments of the present invention may have a tap density of 1.5 g/cc or more, or 1.5 g/cc to 4.0 g/cc. High capacity characteristics may be exhibited by having a high tap density in the above-described range. The tap density of the positive electrode active material may be measured, e.g., using a conventional tap density measuring instrument, specifically, TAP-2S of LOGAN Co., Ltd. In some embodiments, the positive electrode active material may have a tap density of 2.0 g/cc to 2.5 g/cc.

In addition, the positive electrode active material according to some embodiments of the present invention may exhibit a lithium ion conductivity of $10^{-7}$ S/cm or more, specifically, $10^{-3}$ S/cm or more, at 25° C. Specifically, when the positive electrode active material has a rolling density of 2 to 4 g/cc, a lithium ion conductivity of $10^{-2}$ to $10^{-3}$ S/cm may be exhibited.

As discussed, another aspect of the present invention provides a method for preparing a positive electrode active material. The method in accordance with embodiments of the present invention may include a first process of forming an amorphous oxide using a first raw material including silicon, a second raw material including nitrogen, and a third raw material including at least one metal element selected from the group consisting of a Group 1A element, a Group 2A element, and a Group 3B element; and a second process of forming a surface treatment layer including an amorphous oxide on a lithium composite metal oxide by mixing the amorphous oxide and the lithium composite metal oxide and performing heat treatment.

Specifically, the first process may be a process of forming an amorphous oxide by mixing the first raw material, the second raw material, and the third raw material, and melting the mixture at 900° C. to 1,800° C. followed by cooling. The above-described melting temperature may be controlled according to types and a mixing ratio of the first raw material, the second raw material, and the third raw material.

Without intending to limit the scope of the present invention, for example, the first raw material may be silicon oxide ($SiO_2$), the second raw material may be at least one selected from the group consisting of silicon nitride ($Si_3N_4$) and aluminum nitride (AlN), and the third raw material may be at least one selected from the group consisting of sodium oxide ($Na_2O$), magnesium oxide (MgO), calcium oxide (CaO), and yttrium oxide ($Y_2O_3$).

A mixing ratio of the first raw material, the second raw material, and the third raw material may be appropriately determined in consideration of content in the amorphous oxide forming the surface treatment layer. In some embodiments, the first raw material, the second raw material, and the third raw material may be mixed at a molar ratio of (0.5 to 1.5):(0.5 to 1.5):(0.5 to 1.5), and specifically, (0.8 to 1.2):(0.8 to 1.2):(0.8 to 1.2). The reason for limiting the values is the same as described in the description of the molar ratio of the silicon oxide, the nitride, and the metal oxide in the amorphous oxide.

A process of pulverizing the amorphous oxide so that an average particle diameter thereof is in a range 1 to 1,000 nm, specifically 50 to 300 nm, may be further performed after the first process is performed. The amorphous oxide preferably has the above-mentioned particle size to be well applied on the core. When the average particle diameter is less than the above-described range, a coating property with respect to a surface of the positive electrode active material may be deteriorated due to the aggregation of the raw material particles. On the other hand, when the average particle diameter exceeds the above-described range, the compactness of the surface treatment layer formed on the core may be deteriorated.

The pulverization may be performed by a conventional pulverizing process such as ball milling.

In the second process, the mixing may be, suitably, solid phase mixing. In case of solid phase mixing, there are no concerns about the generation of side reactants due to a solvent or the like used in liquid mixing, and a more uniform surface treatment layer may be formed.

In the second process, the heat treatment may be performed at a temperature of 300° C. to 700° C., and suitably, 300° C. to 500° C. When the temperature is less than the above-described temperature, the formability of the surface treatment layer may be deteriorated. When the temperature exceeds the above-described temperature, on the other hand, modification of the positive electrode active material may be caused, and side reactants due to excessive sintering may be generated.

An atmosphere at the time of the heat treatment is not particularly limited, and the heat treatment may be performed under a vacuum atmosphere, an inert atmosphere or an air atmosphere. In addition, the heat treatment process may be performed under the above-described conditions for 5 to 48 hours, or 10 to 20 hours.

In addition, the heat treatment process may be performed in multiple steps within the above-described temperature range, and may be performed by varying the temperature each step.

Still another aspect of the present invention provides a positive electrode including the positive electrode active material in accordance with embodiments of the invention.

Specifically, the positive electrode includes a positive electrode collector and a positive electrode active material layer formed on the positive electrode collector and including the positive electrode active material.

The positive electrode collector is not particularly limited as long as it does not cause a chemical change in a battery and has conductivity, and may be, for example, stainless steel, aluminum, nickel, titanium, calcined carbon, or aluminum or stainless steel whose surface is treated with carbon, nickel, titanium or silver. In addition, the positive electrode collector may have a thickness of 3 to 500 µm, and the adhesive strength of the positive electrode active material may be increased by forming fine irregularities on the surface of the collector. For example, a positive electrode collector in various forms such as a film, a sheet, a foil, a net, a porous body, a foaming body, and a non-woven fabric body may be used.

In addition, the positive electrode active material layer may include a conductive agent and a binder in addition to the above-described positive electrode active material.

Here, the conductor, used to impart conductivity to an electrode, may be any one that does not cause a chemical change and has electric conductivity in the battery without particular limitation. As an example, the conductive agent may include a graphite such as natural or artificial graphite; a carbon-based material such as carbon black, acetylene black, Ketjen black, channel black, furnace black, lamp black, summer black, or carbon fiber; a metal powder or metal fiber formed of copper, nickel, aluminum or silver; a conductive whisker such as zinc oxide or potassium titanate; a conductive metal oxide such as titanium oxide; or a conductive polymer such as a polyphenylene derivative, which may be used alone or in a mixture of two or more thereof. The conductive agent may be, typically, included at 1 to 30 wt % with respect to the total weight of the positive electrode active material layer.

In addition, the binder serves to improve adhesion between the positive electrode active material particles, and the adhesive strength between the positive electrode active material and the collector. Specific examples of the binder may include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated-EPDM, styrene butadiene rubber (SBR), fluoro rubber, and various copolymers thereof, which may be used alone or in a mixture of two or more thereof. The binder may be included at 1 to 30 wt % with respect to the total weight of the positive electrode active material layer.

The positive electrode may be prepared according to a conventional positive electrode preparation method, except that the above-described positive electrode active material is used. Specifically, the positive electrode may be prepared by coating a positive electrode collector with a composition for forming a positive electrode active material layer including the above-described positive electrode active material, and selectively, a binder and a conductive agent, and performing drying and rolling. Here, the types and contents of the positive electrode active material, the binder, and the conductive agent are the same as described above.

The solvent may be any solvent that is generally used in the art, for example, dimethyl sulfoxide (DMSO), isopropyl alcohol, N-methylpyrrolidone (NMP), acetone, water, or the like, and one of these solvents or a mixture of two or more thereof may be used. Considering a thickness of an applied slurry and a manufacturing yield, an amount of the solvent to be used is determined to dissolve or disperse the positive electrode active material, the conductive agent and the binder so that the resulting composition can have a viscosity sufficient to exhibit excellent thickness uniformity when applied to prepare a positive electrode.

Alternatively, the positive electrode may be prepared by casting the composition for forming the positive electrode active material layer on a separate support, and laminating a film obtained by peeling from the support onto the positive electrode collector.

Yet another aspect of the present invention provides an electrochemical device including the above-described positive electrode. The electrochemical device may be, specifically, a battery or a capacitor, and more specifically, a lithium secondary battery.

The lithium secondary battery includes, specifically, a positive electrode, a negative electrode located opposite to the positive electrode, a separator interposed between the positive electrode and the negative electrode, and an electrolyte, and the positive electrode is the same as described above. In addition, the lithium secondary battery may selectively further include a battery case accommodating an electrode assembly of the positive electrode, the negative electrode and the separator, and a sealing member sealing the battery case.

In the lithium secondary battery, the negative electrode includes a negative electrode collector and a negative electrode active material layer located on the negative electrode collector.

The negative electrode current collector is not particularly limited as long as it does not cause any chemical change in the fabricated battery and has high conductivity. For example, the negative electrode current collector may be made of copper, stainless steel, aluminum, nickel, titanium, or calcined carbon; copper or stainless steel surface-treated with carbon, nickel, titanium, or silver; an aluminum-cadmium alloy; or the like. In addition, the negative electrode collector may conventionally have a thickness of 3 to 500 µm, and the adhesive strength of the negative electrode active material may be reinforced by forming fine irregularities on the surface of the collector like the positive electrode collector. For example, the current collector may be used in various forms including a film, a sheet, a foil, a net, a porous structure, a foam, non-woven fabric, and the like.

The negative electrode active material layer selectively includes a binder and a conductive agent together with the negative electrode active material. The negative electrode material layer may be prepared, for example, by coating the negative electrode collector with a composition for forming a negative electrode, which includes a negative electrode active material, and selectively a binder and a conductive agent, drying or casting the composition for forming a negative electrode on a separate support, and laminating a film peeled from the support on the negative electrode collector.

As the negative electrode active material, a compound enabling reversible intercalation and deintercalation of lithium may be used. Non-limiting examples of the compound may include carbonaceous materials such as artificial graphite, natural graphite, graphitized carbon fiber and amorphous carbon; a metal compound capable of alloying with lithium such as Si, Al, Sn, Pb, Zn, Bi, In, Mg, Ga, Cd, a Si alloy, a Sn alloy or an Al alloy; a metal oxide capable of doping and dedoping lithium such as $SiO_x$ (0<x<2), $SnO_2$, vanadium oxide, and lithium vanadium oxide; or a composite including the above-described metallic compound and a carbonaceous material such as a Si—C composite or a Sn—C composite, which may be used alone or in a mixture of two or more thereof. In addition, a metal lithium thin film may be used as the negative electrode active material. In addition, low-crystalline carbon, high-crystalline carbon, and the like may all be used as the carbon material. Typical examples of the low-crystalline carbon may include soft carbon and hard carbon, and typical examples of the high-crystalline carbon may include amorphous, platy, flaky, spherical, or fibrous natural graphite or artificial graphite, and high-temperature calcined carbon such as Kish graphite, pyrolytic carbon, mesophase pitch based carbon fiber, meso-carbon microbeads, mesophase pitches, and petroleum or coal tar pitch derived cokes.

In addition, the binder and the conductive agent may be the same as those described above for the positive electrode.

Meanwhile, in the lithium secondary battery, the separator separates a negative electrode and a positive electrode, provides a migration path for lithium ions, and can be any one used in conventional lithium secondary batteries as a separator without particular limitation. Particularly, one that has low resistance with respect to the ion migration of an electrolyte, and an excellent electrolyte-retaining ability may be used. Specifically, a porous polymer film, for example, a porous polymer film prepared of a polyolefin-based polymer such as an ethylene homopolymer, a propylene homopolymer, an ethylene/butene copolymer, an ethylene/hexene copolymer or an ethylene/metacrylate copolymer, or a laminate structure having two or more layers thereof, may be used. In addition, as a separator, a conventional porous non-woven fabric body, for example, glass fiber with a high melting point or polyethylene terephthalate fiber, may be used. In addition, to ensure thermal resistance or mechanical strength, a coated separator including a ceramic component or a polymer material may be used, or may be selectively formed in a single- or multi-layer structure.

In addition, as the electrolyte used in the present invention, an organic liquid electrolyte, an inorganic liquid electrolyte, a solid polymer electrolyte, a gel-type polymer electrolyte, a solid inorganic electrolyte, or a molten inorganic electrolyte, which is able to be used in preparing a lithium secondary battery, may be used, but the present invention is not limited thereto.

Specifically, the electrolyte may include an organic solvent and a lithium salt.

The organic solvent may be any one that can serve as a medium in which ions involved in an electrochemical reaction of a battery can migrate, without particular limitation. Specifically, the organic solvent may be an ester-based solvent such as methyl acetate, ethyl acetate, γ-butyrolactone or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol, or isopropyl alcohol; a nitrile such as R—CN (R is a linear, branched or cyclic C2-C20 hydrocarbon group, and may include a double bond, an aromatic ring or an ether bond); an amide such as dimethylformamide; a dioxolane such as 1,3-dioxolane; or a sulfolane. Among these, the organic solvent is preferably a carbonate-based solvent, and more preferably, a mixture of a cyclic carbonate (e.g., ethylene carbonate or propylene carbonate) having high ion conductivity and high permittivity to improve charge/discharge performance of a battery, and a low-viscosity linear carbonate-based compound (e.g., ethyl methyl carbonate, dimethyl carbonate or diethyl carbonate). In this case, a cyclic carbonate and a linear carbonate may be mixed at a volume ratio of approximately 1:1 to 1:9, resulting in excellent performance of the electrolyte.

The lithium salt may be any compound capable of providing lithium ions used in a lithium secondary battery without particular limitation. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiC_1$, $LiI$, or $LiB(C_2O_4)_2$. A concentration of the lithium salt may be in a range of 0.1 to 2.0 M. When the concentration of the lithium salt is in the above range, the electrolyte may have suitable conductivity and viscosity, and thus excellent electrolyte performance may be exhibited, and lithium ions may effectively migrate.

In addition to the above components of the electrolyte, to improve the lifespan characteristics of a battery, inhibit a decrease in battery capacity, and improve the discharge capacity of a battery, the electrolyte may further include, for example, one or more additives selected from a haloalkylene carbonate-based compound such as difluoroethylene carbonate, pyridine, triethylphosphite, triethanolamine, cyclic ethers, ethylene diamine, n-glyme, hexaphosphoric acid triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride. Here, the additive may be included at 0.1 to 5 wt % with respect to the total weight of the electrolyte.

Since the lithium secondary battery including the positive electrode active material according to the present invention stably exhibits excellent discharge capacity, output characteristic and capacity retention rates, the lithium secondary battery is useful for portable devices such as mobile phones, notebook computers, digital cameras, etc., and in the field of electric vehicles such as a hybrid electric vehicle (HEV).

In particular, the lithium secondary battery according to the present invention may be usefully used as a high voltage battery having a voltage of 4.3 V or more, for example, 4.5 V.

Therefore, according to another exemplary embodiment of the present invention, a battery module including the lithium secondary battery as a unit cell, and a battery pack including the same are provided.

The battery module or battery pack may be used as a power source for any one or more medium-and-large sized devices such as power tools; electric cars such as an electric vehicle (EV), a hybrid electric vehicle, and a plug-in Hybrid Electric Vehicle (PHEV); and systems for storing electric power.

EXAMPLES

Hereinafter, the present invention will be described in further detail with reference to the following examples such that the invention may be carried out by one of ordinary skill in the art to which the present invention pertains without undue difficulty. However, the present invention may be embodied in many different forms and these examples are not intended to limit the scope of the present invention.

Example 1-1

First to third raw materials listed in Table 1 were mixed in molar ratios shown in Table 1 below. The resultant was melted at 1,600° C. and cooled at room temperature to prepare an amorphous oxide. Thereafter, the amorphous oxide was pulverized to have an average particle size ($D_{50}$) of 300 nm.

Next, 0.05 part by weight of the amorphous oxide was solid phase mixed in a reactor with respect to 100 parts by weight of the lithium composite metal oxide ($D_{50}$=13 μm) described in Table 1 below, and then heated at 500° C. Thus, a positive electrode active material having a surface treatment layer including an amorphous oxide formed on a core including a lithium composite metal oxide was prepared.

Example 2-1

Except for the use of first, second and third raw materials listed in Table 1 below, a positive electrode active material was prepared with the same method as in Example 1-1.

Example 3-1

Except for the use of lithium composite metal oxide listed in Table 1 below, a positive electrode active material was prepared with the same method as in Example 2-1.

Comparative Example 1-1

A lithium composite metal oxide of $LiNi_{0.6}Co_{0.2}Mn_{0.2}O_2$ ($D_{50}$=13 μm) was used as a positive electrode active material.

Comparative Example 2-1

Except for the use of raw material listed in Table 1 below, a positive electrode active material was prepared with the same method as in Example 1-1.

TABLE 1

| Classification | First Raw Material | Second Raw Material | Third Raw Material | Mixing Ratio (Molar Ratio) of First Raw Material: Second Raw Material: Third Raw Material | Lithium Composite Metal Oxide |
|---|---|---|---|---|---|
| Example 1-1 | $SiO_2$ | $Si_3N_4$ | MgO | 1:1:1 | $LiNi_{0.6}Co_{0.2}Mn_{0.2}O_2$ |
| Example 2-1 | $SiO_2$ | AlN | $Y_2O_3$ | 1:1:1 | $LiNi_{0.6}Co_{0.2}Mn_{0.2}O_2$ |
| Example 3-1 | $SiO_2$ | AlN | $Y_2O_3$ | 1:1:1 | $LiNi_{0.8}Co_{0.1}Mn_{0.1}O_2$ |
| Comparative Example 1-1 | — | — | — | — | $LiNi_{0.6}Co_{0.2}Mn_{0.2}O_2$ |
| Comparative Example 2-1 | | $Si_3N_4$ | — | — | $LiNi_{0.6}Co_{0.2}Mn_{0.2}O_2$ |

Examples 1-2 to 3-2, Comparative Example 1-2, and Comparative Example 2-2: Preparation of Lithium Secondary Battery The positive electrode active material shown in Table 2 below, carbon black and PVdF were mixed in a weight ratio of 95:2.5:2.5 and mixed with N-methylpyrrolidone to prepare a composition for forming a positive electrode (viscosity: 5000 mPa·s), and the composition was applied on an aluminum current collector, dried at 130° C., and rolled to prepare a positive electrode.

A mixture of natural graphite as a negative electrode active material, carbon black as a conductive agent, and PVdF as a binder mixed in a weight ratio of 85:10:5 was mixed with N-methyl pyrrolidone as a solvent to prepare a composition for forming a negative electrode, and the composition was applied to a copper current collector to prepare a negative electrode.

A lithium secondary battery was manufactured by forming an electrode assembly by interposing a porous polyethylene separator between the positive electrode and the negative electrode, placing the electrode assembly in a case, and injecting an electrolyte into the case. Here, the electrolyte was prepared by dissolving 1.0M lithium hexafluorophosphate ($LiPF_6$) in an organic solvent consisting of ethylene carbonate/dimethyl carbonate/ethyl methyl carbonate (mixing volume ratio of EC/DMC/EMC=3/4/3).

TABLE 2

| Classification | Positive Electrode Active Material |
|---|---|
| Example 1-2 | Example 1-1 |
| Example 2-2 | Example 2-1 |
| Example 3-2 | Example 3-1 |
| Comparative Example 1-2 | Comparative Example 1-1 |
| Comparative Example 2-2 | Comparative Example 2-1 |

Experimental Example 1: Evaluation of Characteristics of Lithium Secondary Battery The lithium secondary batteries of Examples 1-2 to 3-2, Comparative Example 1-2, and Comparative Example 2-2 were charged at a constant current (CC) of 1C until 4.25 V at a high temperature (45° C.), and then charged one time at a constant voltage (CV) of 4.25 V until a charge current reached 0.05%. Afterwards, the discharge capacity at the first cycle was measured by discharging at a constant current of 1C until a voltage reached 2.5 V. The cycle efficiency, which is a discharge capacity retention rate according to the number of cycles versus discharge capacity of one cycle, was measured after charging the battery 100 times to 300 times. The result is shown in FIG. 1.

Referring to FIG. 1, it was confirmed that cycle efficiency gradually deteriorated as the number of cycles progressed in the case of the lithium secondary batteries of Examples 1-2 to 3-2. In particular, the lithium secondary battery of Example 3-2 including high nickel content had a cycle efficiency similar to that of the lithium secondary batteries of Examples 1-2 and 2-2. However, the cycle efficiency of the lithium secondary batteries of Comparative Examples 1-2 and 2-2 was significantly degraded compared with the lithium secondary batteries of Examples 1-2 to 3-2. In addition, precipitation occurred in a melting process during the preparation process of the surface treatment layer, so that the surface treatment layer was not formed easily, thereby deteriorating cycle characteristics in case of Comparative Example 2-2.

What is claimed is:

1. A positive electrode active material for a secondary battery, comprising:
   a core comprising a lithium composite metal oxide; and
   a surface treatment layer located on a surface of the core and comprising an amorphous oxide;
   wherein the amorphous oxide including silicon (Si), nitrogen (N) and at least one metal element selected from the group consisting of a Group 1A element, a Group 2A element, and a Group 3B element.

2. The positive electrode active material of claim 1, wherein the surface treatment layer comprises silicon oxide ($SiO_2$), a nitride including at least one metal or semi-metal element selected from the group consisting of a Group 3A element and a Group 4A element, and a metal oxide including at least one metal element selected from the group consisting of a Group 1A element, a Group 2A element, and a Group 3B element.

3. The positive electrode active material of claim 2, wherein a molar ratio of the silicon oxide, the nitride, and the metal oxide is (0.5 to 1.5):(0.5 to 1.5):(0.5 to 1.5).

4. The positive electrode active material of claim 2, wherein the nitride is at least one selected from the group consisting of silicon nitride ($Si_3N_4$) and aluminum nitride (AlN).

5. The positive electrode active material of claim 2, wherein the metal oxide is at least one selected from the group consisting of sodium oxide ($Na_2O$), magnesium oxide (MgO), calcium oxide (CaO), and yttrium oxide ($Y_2O_3$).

6. The positive electrode active material of claim 1, wherein an average thickness of the surface treatment layer is 0.01 to 0.1 times an average radius of the core.

7. The positive electrode active material of claim 1, wherein the lithium composite metal compound is represented by Chemical Formula 1:

$$Li_aNi_xCo_yM1_zM2_wO_2 \qquad <\text{Chemical Formula 1}>$$

wherein,
M1 is at least one selected from the group consisting of Mn and Al,
M2 is at least one element selected from the group consisting of W, Mo, Zr, Ti, Mg, Ta, Al, Fe, V, Cr, Ba, Ca, and Nb, and
$0.8 \leq a \leq 1.5$, $0.3 \leq x < 1$, $0 < y \leq 0.5$, $0 < z \leq 0.5$, $0 \leq w \leq 0.02$ and $x+y+z+w=1$.

8. A positive electrode for a secondary battery comprising the positive electrode active material for a secondary battery of claim 1.

9. A secondary battery comprising the positive electrode for a secondary battery of claim 8.

10. A method for preparing a positive electrode active material for a secondary battery, comprising:
    a first process of forming an amorphous oxide using a first raw material including silicon, a second raw material including nitrogen, and a third raw material including at least one metal element selected from the group consisting of a Group 1A element, a Group 2A element, and a Group 3B element; and
    a second process of forming a surface treatment layer including the amorphous oxide on a lithium composite metal oxide by mixing the amorphous oxide and the lithium composite metal oxide and performing heat treatment.

11. The method of claim 10, wherein the first process is a process of forming an amorphous oxide by mixing the first raw material, the second raw material, and the third raw material, and melting the mixture at 900° C. to 1,800° C. followed by cooling.

12. The method of claim 11, wherein the mixing is performed by mixing the first raw material, the second raw material, and the third raw material at a molar ratio of (0.5 to 1.5):(0.5 to 1.5):(0.5 to 1.5).

13. The method of claim 10, further comprising a process of pulverizing the amorphous oxide so that an average particle diameter thereof is in a range of 1 to 1,000 nm, after the first process is performed.

14. The method of claim 10, wherein the heat treatment is performed at a temperature of 300° C. to 700° C. in the second process.

* * * * *